Figure 2:
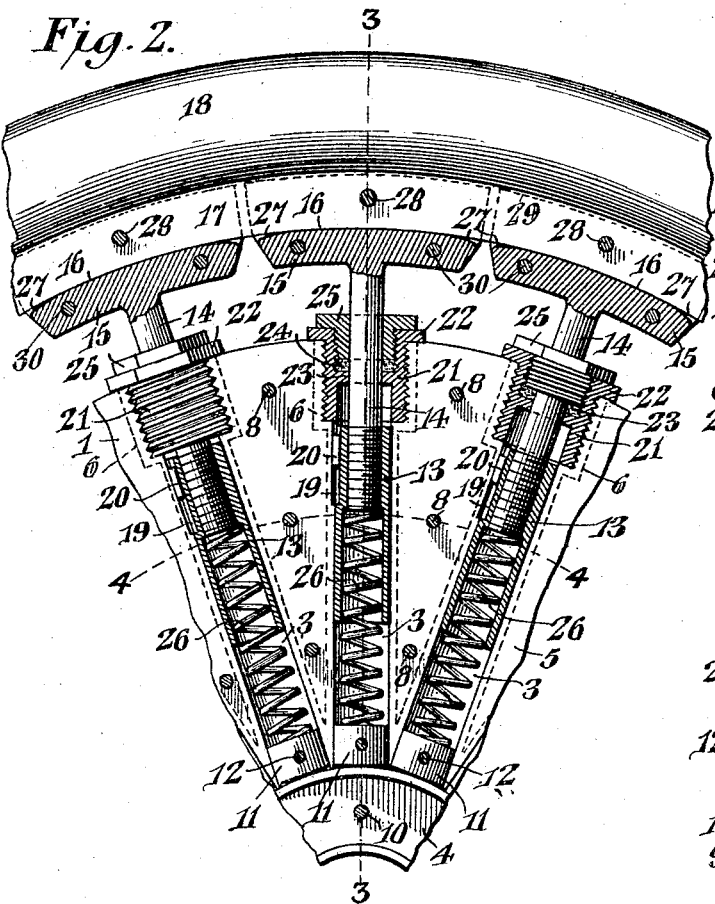

J. J. FAHRNEY.
SPRING WHEEL.
APPLICATION FILED MAY 16, 1914.
1,122,890.
Patented Dec. 29, 1914.
2 SHEETS—SHEET 1.
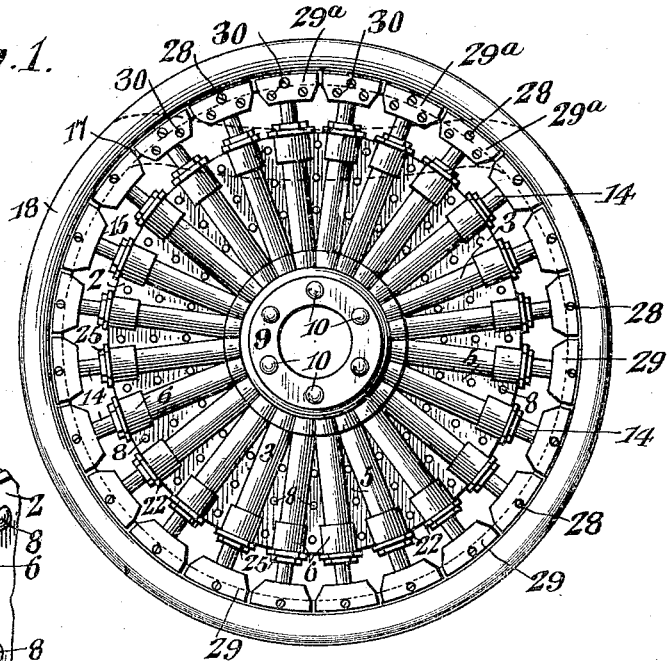
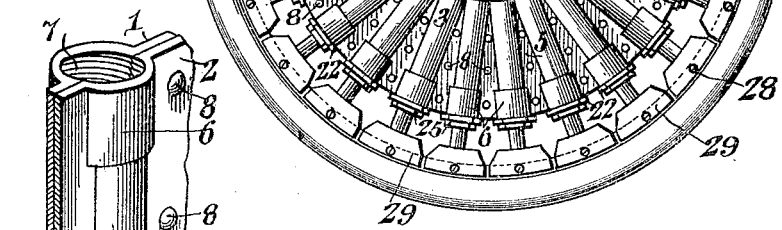
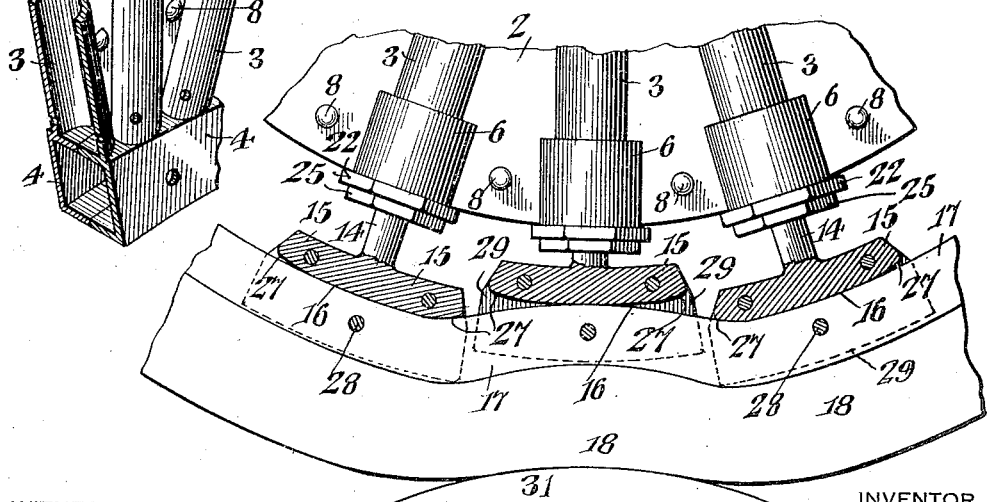
WITNESSES
Jas. K. McCathran
F. T. Chapman
INVENTOR
John J. Fahrney,
BY C. Y. Siggers
ATTORNEY

J. J. FAHRNEY.
SPRING WHEEL.
APPLICATION FILED MAY 16, 1914.

1,122,890.

Patented Dec. 29, 1914.
2 SHEETS—SHEET 2.

WITNESSES
Jas. K. McCathran
F. T. Chapman

John J. Fahrney, INVENTOR
BY E. G. Siggers
ATTORNEY

UNITED STATES PATENT OFFICE.

JOHN J. FAHRNEY, OF TIMBERVILLE, VIRGINIA, ASSIGNOR TO FAHRNEY WHEEL CORPORATION, OF TIMBERVILLE, VIRGINIA, A CORPORATION OF VIRGINIA.

SPRING-WHEEL.

1,122,890.

Specification of Letters Patent.

Patented Dec. 29, 1914.

Application filed May 16, 1914. Serial No. 839,008.

*To all whom it may concern:*

Be it known that I, JOHN J. FAHRNEY, a citizen of the United States, residing at Timberville, in the county of Rockingham and State of Virginia, have invented a new and useful Spring-Wheel, of which the following is a specification.

This invention has reference to improvements in spring wheels, and its object is to provide a wheel which in conjunction with a rubber tire will absorb shocks that otherwise would be transmitted by a rigidly constructed wheel to the running gear of the vehicle.

The present invention is an improvement upon the spring or resilient wheel shown and described in my application No. 802,247, filed November 21, 1913. In the said application the wheel is shown as comprising spokes radiating from a hub, and each provided with a plunger-like member held normally in a projected position by a spring housed within the spoke, the latter being hollow for the purpose, and each plunger-like member terminates in a head channeled peripherally for the reception of an annular web formed upon the tire, which latter may be of the solid rubber type. Moreover, each head is provided with a stem entering the respective spoke and there the spoke is provided with a gland structure which may serve the purpose of a packing gland.

In accordance with the present invention the spokes are all united by connecting webs, thus greatly stiffening the structure and avoiding any other connecting members, such as the connecting ring for the outer ends of the spokes disclosed in the aforesaid application. The spoke portion of the wheel and the hub portion thereof are formed of two steel or other sheet metal stampings or pressings which when brought together face to face define a series of spokes, and also a hub for the wheel, and these two halves are united by rivets or other fastening means making a particularly rigid structure. While the spokes thus formed are each provided at the outer ends with a gland structure somewhat similar to that shown in the aforesaid application, the present invention is in this respect somewhat modified over the showing of the application, and the plungers which extend into the spokes are correspondingly modified.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

Figure 3:
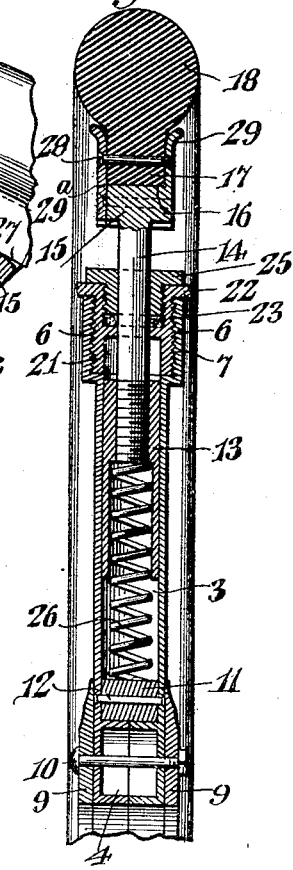
Figure 4:
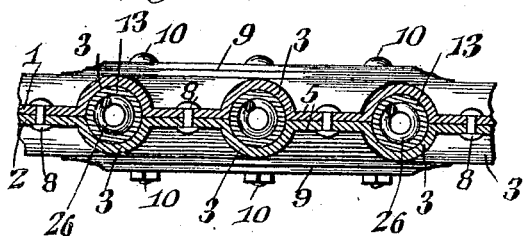
Figure 5:
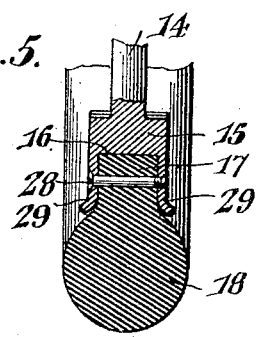

In the drawings: Figure 1 is an elevation of a wheel constructed in accordance with the present invention. Fig. 2 is a view of a fragment of a wheel with parts in section and drawn on a larger scale than that of Fig. 1. Fig. 3 is a section on the line 3—3 of Fig. 2. Fig. 4 is a section on the line 4—4 of Fig. 2. Fig. 5 is a fragmentary section similar to Fig. 3, but showing a modified form of tire receiving head. Fig. 6 is a fragmentary view with parts in section on a scale similar to Fig. 2, but showing the ground engaging portion of the wheel and illustrating its action on a somewhat exaggerated scale. Fig. 7 is a perspective view of a fragment of the sheet metal shell making up the body of the wheel.

Referring to the drawings there are shown two plates 1, 2, respectively, each of general annular form and at frequent intervals shaped into matching semi-tubular radial portions together constituting hollow spokes 3. These spokes radiate from a hollow annulus 4 constituting the hub portion of the wheel, and like the remainder of the shell of the wheel, made in two like parts or halves, the spokes and hub portions with connecting webs 5 being all in the form of sheet metal stampings or pressings, usually of steel, but which may be made of other sheet metals if desired. The outer end of each spoke is laterally enlarged, as shown at 6, to form a socket for a purpose to be described, and the inner wall of each socket is screw threaded, as indicated at 7. Such a basic shell for the wheel is particularly rigid, and because of the radial hollow ribs forming the spokes 3, the shell of the wheel is particularly resistant to distorting forces, and at the same time the structure, because of its rigidity due to its form, may be made out of relatively light-gage sheet metal, whereby the weight of the wheel may be kept down within reasonable limits.

The two halves of the shell of the wheel are joined by rivets 8 extending through the connecting webs or any other fastening may be employed, while the hub portion of the wheel has face plates 9 applied thereto and extending through these face plates and through the hub are bolts or rivets 10. These face plates may extend radially for a short distance upon the hub ends of the spokes for ornamental appearance. At the inner or hub end of each spoke there is lodged a block 11 held in place by a pin or rivet 12 which may extend through the opposite sides of the spoke adjacent to the hub 4 and the radially extended outer edges of the face plates also cover these pins holding them in place and hiding them from view, so that besides the ornamental effect of the base plates they serve to prevent the escape and loss of the pins 12.

Lodged within each spoke is a sleeve 13 which may be threaded at one end for attachment to a stem 14 of a length to project beyond the socket end 6 of the spoke, and at the outer end each stem terminates in a head 15 extending in a direction axially of the wheel and also circumferentially of the wheel. Each head is formed with a channel 16 extended circumferentially of the wheel, this channel being suitably shaped to receive a circumferential web 17 on the inner edge of a tire 18, the latter being of any appropriate shape, being shown in the drawings as approximately circular in shape, but it will be understood that this particular shape is not at all obligatory, and will vary in accordance with the conditions to be met.

The spokes are of maximum number for the particular diameter of the wheel, and in an automobile or automobile truck wheel of average size the spokes will approximate twenty-four in number, while the circumferential length of the heads 15 will approximate four inches, each head being separated a short distance from its neighbors to permit radial movements of the heads without interference one with the other.

Before describing those features of the heads and tire which are peculiar to the present invention, the manner of mounting and securing the heads in the spokes will be described in detail. Each spoke 3 at an appropriate point is provided with a short longitudinal channel 19, and each sleeve 13 at an appropriate point is provided with a key 20 adapted to the channel 19, so that each sleeve may move lengthwise of its spoke without turning therein, and as each stem 14 is made fast to a respective sleeve 13 all the heads 15 may be circumferentially alined, and will retain such relative positions because of the keys or splines 20 lodged in the grooves 19. Lodged in each socket 6 is an externally threaded sleeve 21 having one end provided with a radial flange 22 of polygonal contour for the application of a tool, the outline of the flange being customarily hexagonal. Each sleeve 21 has about midway of its length an internal annular flange 23 of a size to permit the passage of the stem 14 freely yet snugly, and this flange 23 constitutes a seat for a packing ring or gasket 24 held in the sleeve by a packing gland 25 threaded into the outer end of the sleeve. The other or inner end of the sleeve 21 is longitudinally smooth and of a diameter substantially that of the inner diameter or bore of the spoke, so that each sleeve 13 may enter the corresponding sleeve 21 at the inner end of the latter. Each sleeve 13 is thickened at the outer end where the stem 14 is threaded into it, and for the remainder of the sleeve the internal bore may be enlarged, so that the sleeve snugly yet freely receives one end of a coiled compression spring 26, the other end of the spring abutting against a respective block 11. Each spring 26 is under initial compression sufficient to sustain its proportion of the weight of the vehicle and the load which the vehicle is designed to carry, so that each spring is initially under considerable pressure, and the heads and plungers carrying them and made up of the stems 14 and sleeves 13 are prevented from outward projection beyond a determined limit by the tire 18. Each head 15 has what may be termed the bottom of its channel 16 in the main conforming to the curvature of the tire, but at the ends each channel has a rounded terminal portion 27 curving toward the hub of the wheel on a shorter radius or more abruptly. The web or rib 17 of the tire is seated in the series of channels 16 and is there held by a screw, bolt or pin 28 extending through the side wings of the channel portion of each head, these wings being indicated at 29. The purpose of the pins 28 so far as the tire is concerned is to prevent the latter from creeping, but otherwise these pins have no particular function with respect to the tire. They have a function, however, in tying together the wings 29, especially when the devices 28 are either in the form of screws or bolts, although under some circumstances they might be in the form of pins with the ends headed or riveted.

Since the channels 16 form in effect a continuous circumferential channel and such channel is of considerable depth radially, certain of the heads 15 have removable side plates 29ª on one side instead of integral wings 29, these plates being held to the heads by screws 30 or otherwise. Enough of the heads are provided with removable side plates 29ª to permit placing of the tire into the major portion of the channels through their outer ends, and then the application of the remainder of the tire to the channels in a lateral direction, the temporary absence of the plates 29ª avoiding any necessity of prying the tire over the outer edges of the channeled heads. In a twenty-four spoke wheel the provision of six consecutive heads with removable side plates is usually sufficient for the ready application to or removal of the tire from the wheel.

Under ordinary running conditions on a smooth roadway there need be but little if any give to the wheel, but should the wheel meet an obstruction the sudden resistance would with a rigid wheel cause the elevation of the wheel and of the vehicle for a distance sufficient to override the obstruction. In a resilient wheel a sudden resistance offered by the obstruction is met by a yielding of the elastic element in the path of the force exerted by the obstruction, so that the shock is taken up by the yielding resilient element and the vehicle does not receive it. The action of the wheel of the present invention is shown on a somewhat exaggerated scale in Fig. 6 where an obstruction 31 is assumed to be in the path of the wheel. Under such circumstances one of the heads then at the lowermost part of the wheel has the shock of the obstruction imparted to it through the tire, such shock being to an extent absorbed by the rubber tire itself, but a proportion of the shock is exerted in compressing the particular spring 26 belonging to the head in question. This spring yields to the superior force and the stem 14 moves into the spoke, the head 15 approaching the shell of the wheel. Since the heads 15 are relatively short in a circumferential direction, the tire bends under the impact of the obstruction toward the hub portion of the wheel and the rib or web 17 follows the head where connected thereto by the screw or bolt 28, being forced with the head toward the hub portion of the wheel by the obstruction. The web would be liable to shearing where engaging the next heads in order were it not for the shorter rounded ends 27 of the channel members allowing the web of the tire to bend gradually instead of being subjected to a sudden strain, and a tendency to shear at such point. Since the force tending to compress the springs is not exerted at one time upon more than one or two of the heads of a tire and the stems of the neighboring heads are out of parallelism with the particular head or heads being acted upon, such neighboring heads do not readily yield, but the tire may yield and more closely hug the terminal portions of the channel heads where the bottoms of these channels are more pronouncedly curved, the web of the tire pulling away from the corresponding portions of the channel head which has yielded under the impact of the obstruction.

The inner surfaces of the wings 29 or the wings 29 and plates 29ª, as the case may be, are in approximate parallelism. If they approach toward their radial outer edges the web 17 will bind and the tire will jam and tear. If the wings flare to any material extent in a radially outward direction, then the tire is liable to be pulled out of the seats in the heads by side thrust. The ideal condition is to have the facing portions of the side wings of each channel head in true parallelism, but slight variations from such parallelism which neither cause a binding of the web of the tire or permit any pulling out tendency due to side thrust are allowable. While these very slight variations may be permissible, it will be understood that for all practical purposes the inner faces of the side wings must be effectively parallel.

The rim structure disclosed is not claimed herein, being shown, described and claimed in another application, Serial No. 860,263, filed by me on September 4, 1914, for a resilient wheel.

What is claimed is:—

1. A vehicle wheel having a body portion composed of joined sheet metal stampings each representing one-half of the wheel and each having radial channels together forming tubular spokes with the outer end of each spoke laterally enlarged and threaded to form a threaded radial socket, a sleeve lodged in each spoke and movable lengthwise thereof, a spring between the sleeve and the inner end of the spoke, a stem fast to the sleeve and projecting through and beyond the socket end of the spoke and there formed with a channel head to receive a vehicle tire, and guiding and retaining means comprising a threaded sleeve adapted to the threaded socket portion of the spoke, said sleeve having an intermediate interior annular flange guiding the stem of the head, and a packing gland and packing carried by the outer end of the last-named sleeve with the packing lodged against the flange, said flange constituting an abutment for limiting the outward movement of the head under the action of the spring.

2. A vehicle wheel having a body portion composed of joined sheet metal stampings each representing one-half of the body of the wheel and each having radial channels together forming tubular spokes with the outer end of each spoke laterally enlarged and threaded to form a threaded radial socket, a sleeve lodged in each spoke and movable lengthwise therein, a spring between the sleeve and the inner end of the spoke, a stem fast to the sleeve and projecting through and beyond the socket end of the spoke and there formed with a channel head to receive a vehicle tire, and guiding and retaining means comprising a threaded sleeve adapted to the threaded socket portion of the spoke, said sleeve having an intermediate interior annular flange guiding the stem of the head, and a packing gland and packing carried by the outer end of the last-named sleeve, with the packing lodged against the flange, said flange constituting an abutment for limiting the outward movement of the head under the action of the spring, the internal diameter of the second-named sleeve being sufficient to receive the corresponding end of the first-named sleeve, and said first-named sleeve and spoke being provided with coacting parts for preventing turning of the first-named sleeve and parts carried thereby in the spoke.

3. A vehicle wheel comprising a two part sheet metal shell with the two parts secured together face to face and provided with radial hollow heads or channels together defining hollow spokes in number representing the maximum number of spokes for the size of the wheel, blocks lodged in the inner ends of the spokes and provided with pins extending to the exterior of the spokes for holding the blocks in position, face plates at the hub ends of the spokes having a radial extent to cover the ends of the pins, radially movable heads with stems entering the spokes and with springs within the spokes tending to project the heads, and guiding and packing means at the outer ends of the spokes for said stems, the heads at the ends of the stems each being channeled circumferentially to provide a substantially continuous circumferential channel for the reception of a tire.

In testimony that I claim the foregoing as my own, I have hereto affixed my signature in the presence of two witnesses.

JOHN J. FAHRNEY.

Witnesses:
B. W. HITS,
W. L. RIFE.

Copies of this patent may be obtained for five cents each, by addressing the "Commissioner of Patents, Washington, D. C."